Patented Oct. 26, 1948

2,452,420

UNITED STATES PATENT OFFICE 2,452,420

PHENOL-ALDEHYDE MOLDING COMPOSITIONS

John Allan, Spondon, near Derby, England, assignor, by mesne assignments, to Celanese Corporation of America, a corporation of Delaware No Drawing. Application October 28, 1944, Serial No. 560,915. In Great Britain September 7, 1943

2 Claims. (Cl. 260—38)

This invention relates to moulding and in particular to moulding compositions having a basis of a thermo-setitng synthetic resin.

For some purposes there is a demand for a composition of the kind referred to above, capable of producing mouldings which combine resistance to alkaline baths with high impact strength. The present invention is the result of an extensive research carried out with a view to obtaining a composition having the combination of properties referred to above. In the course of this research, trials were carried out on a large number of commercial moulding powders but none of these gave the combination of properties required. Attempts were then made to achieve the desired result by modifying such moulding powders in various ways, for example, by the addition of alkali-resistant materials such as ethyl cellulose and other cellulose ethers, chlorinated paraffin hydrocarbons, chlorinated naphthalenes, drying oils and semi-drying oils, e. g. linseed oil, oiticia oil or soya-bean oil; by replacing the usual wood-flour filter with a more alkali-resistant substance, for example asbestos floats, powdered slate or magnesium carbonate; by employing instead of the usual phenol-formaldehyde synthetic resin, condensation products of aldehydes of higher molecular weight, e. g. benzaldehyde or butyraldehyde with common phenol or with phenols of higher molecular weight, e. g. meta-cresol. It was not found possible, however, by any of these methods to obtain good resistance to alkaline baths without a substantial decrease in impact strength. I have now found, however, that the desired combination of properties can be obtained in mouldings comprising an insoluble infusible phenol-acetaldehyde synthetic resin i. e. an insoluble infusible synthetic resin derived from a condensation product of phenol and acetaldehyde by heating, preferably in the presence of a source of formaldehyde. Such mouldings are preferably obtained by the combined action of heat and high pressure on a moulding stock comprising a thermo-setting phenol-acetaldehyde condensation product, hexamethylene tetramine and a filler comprising asbestos fibre. By a thermo-setting condensation product is meant one which can be converted by heating (if necessary in the presence of a source of formaldehyde such as hexamethylene tetramine) into an insoluble infusible synthetic resin. Preferably the thermo-setting condensation product used is an ethanol-soluble product of the condensation of phenol with acetaldehyde in substantially equi-molecular proportions in the presence of an acid catalyst, the said condensation product being adapted to form an insoluble infusible synthetic resin when heated with hexamethylene tetramine. The valuable properties of the mouldings of the invention are surprising since comparative trials using phenol-acetaldehyde and phenol-formaldehyde synthetic resins with a wood-flour filling showed the product based on the phenol-acetaldehyde synthetic resin to be even less resistant to alkaline baths than that based on the phenol-formaldehyde resin. With the asbestos fibre filling however the acetaldehyde-phenol moulding is considerably more alkali-resistant than the formaldehyde-phenol moulding.

The thermo-setting condensation product is preferably made by condensing phenol and acetaldehyde in proportions of about 2:1 by weight, i. e., slightly more than one molecular proportion of acetaldehyde to one of phenol, in the presence of an acid catalyst. When the condensation product is made in this way an additional quantity of an aldehyde must be provided, preferably together with an alkaline catalyst, to produce the desired insoluble infusible synthetic resin. Preferably a phenol-acetaldehyde-formaldehyde synthetic resin is produced by heating the thermo-setting condensation product with hexamethylene tetramine which supplies both the additional aldehyde required and an alkaline catalyst, viz. ammonia. The asbestos fibre may with advantage be present to the extent of about 35–50% of the weight of the moulding-powder. It should be free from contamination with cellulosic fibre. Aluminium stearate may be employed as the mould-lubricant and may constitute about 2% of the weight of the powder. The proportion of hexamethylene tetramine is important. Thus, I have found that the molecular ratio of the acetaldehyde which has gone into the production of the thermo-setting condensation product plus the formaldehyde derivable from the hexamethylene tetramine to the phenol which has gone into the production of said condensation product, has an important influence upon the alkali-resistance of mouldings made from the moulding stock. Preferably this ratio is at least 2:1 although it may be somewhat lower, e. g. about 1.5:1. On the other hand the ratio in question may with advantage be higher than 2:1. Excellent results have been obtained when the acetaldehyde and phenol are employed in about equimolecular proportions and the molecular ratio of available formaldehyde to phenol employed ranges from about 1:1 to about 1.25:1, e. g. 0.94:1 to 1.26:1.

The hexamethylenetetramine may constitute from about 2.5% to about 10% by weight of the moulding composition.

The moulding stock may be obtained by mixing the asbestos fibre, preferably carded fibre, into solution of the thermo-setting condensation product in ethanol, adding the hexamethylene tetramine and mould-lubricant, removing alcohol by evaporation and disintegrating the residue. To obtain maximum impact resistance in mouldings made from the moulding stock, care must be taken that the disintegration operation is not unduly severe, and I have found that it is of very great advantage to carry out this operation while the composition still contains a proportion of the alcohol, for example, about 5%. Residual alcohol may then be removed after disintegration. Disintegration can conveniently be effected in a disintegrator of the rotating arm kind. Instead of ethanol other volatile solvents for the thermo-setting condensation product, e. g. methanol or acetone, or mixtures of ethanol with methanol or acetone, or of methanol with acetone, can be used.

The following examples illustrate the invention:

*Example 1*

250 parts of paraldehyde are slowly added to 500 parts of phenol containing about 1% of concentrated hydrochloric acid as catalyst, the temperature being maintained at about 50° C. during the addition. The temperature is then raised to 98–100° C. and the reaction mix separates into an aqueous and a resinous layer. The heating is continued for about half-an-hour at about 120–130° C. In this way a clear dark red-brown viscous resin is obtained which sets when cold. This resin is washed free from acid with warm water, separated and the remaining moisture removed by vacuum distillation at a temperature of about 100° C. From the resulting synthetic resin (the thermo-setting condensation product) a moulding powder of the following composition is made:

| | Parts by weight |
|---|---|
| Thermo-setting condensation product | 53.5 |
| Carded asbestos fibre | 35.0 |
| Hexamethylene tetramine | 9.5 |
| Aluminium stearate | 2.0 |

In making the moulding powder the thermo-setting condensation product obtained as described above is dissolved in industrial alcohol to give a solution containing about 500 grams of the resin per litre and the asbestos fibre is mixed into this solution in a Werner-Pfleiderer mixer. After thoroughly incorporating the asbestos fibre, hexamethylene tetramine and aluminium stearate are added and incorporated by a further mixing operation. The resulting mixture is then spread on trays and exposed to a temperature of about 65° C. under a vacuum of about 15 inches of mercury for about six hours. The partly dried powder is then disintegrated in a rotating arm disintegrator to a fibrous mass. It is then given a further drying of about ten hours in the vacuum oven under the same temperature and pressure to remove residual alcohol. The powder is then ready for moulding.

Moulding powders produced in this way are very suitable for the production by a hot compression-moulding operation of bobbins suitable for use as package carriers in the saponification of cellulose acetate yarn. Suitable moulding conditions are:

| | | |
|---|---|---|
| Temperature | ° C__ | 170 |
| Pressure | tons per sq. inch__ | 2 |
| Time | minutes__ | 6 |

Other articles which are required to combine alkali resistance with good impact strength can be also made from the moulding compositions of the invention. Among such articles are dishes and other small vessels, and centrifugal spinning pots and other package carriers.

*Example 2*

The thermo-setting condensation product is made as in Example 1. This resin is dissolved together with about 20% of its weight of hexamethylene tetramine in ethanol. An asbestos fabric of the following character:

| | | |
|---|---|---|
| Warp | ends per inch__ | 40 |
| Weft | picks per inch__ | 40 |
| Weight | ounces per square yard__ | 20¾ | is impregnated with the alcoholic solution and dried. The fabric retains about its own weight of the mixture of condensation product and hexamethylene tetramine. The impregnated fabric is cut into pieces of suitable size for forming into the desired moulding.

The conditions for moulding specified above in connection with the moulding stock with carded fibre re-inforcement are suitable.

I have found that moulded products made as described above but substituting for acetaldehyde other aldehydes, for example formaldehyde, benzaldehyde or butyraldehyde in making the thermo-plastic condensation product, have substantially lower alkali resistance, whether or not the phenol is at the same time replaced by other phenols for example, ortho- or meta-cresol. Reduction in the content of hexamethylene tetramine also has this effect. A still greater reduction in alkali-resistance results from replacement of the fibrous asbestos by other fibrous materials, e. g. fibrous materials having a cellulosic basis. On the other hand the replacement of the fibrous asbestos by a non-fibrous material reduces the impact strength. The impact strength is also greatly reduced by disintegration of the moulding stock in a completely dry state, instead of, as described above, in a partly dried condition.

Having described my invention, what I desire to secure by Letters Patent is:

1. Process for the production of moulding stock suitable for the preparation of mouldings of high resistance to alkaline solutions and of high impact strength, which comprises healing phenol and acetaldehyde in approximately equimolecular proportions in the presence of an acid catalyst to obtain a thermo-setting condensation product, dissolving said condensation product in a volatile solvent, mixing into said condensation product solution fibrous asbestos, a mould lubricant, and hexamethylenetetramine in an amount capable of providing not substantially less than one molecular proportion of formaldehyde per molecular proportion of phenol that has gone into the production of said condensation product, removing the bulk of said volatile solvent by evaporation under reduced pressure until the composition contains about 5% of its weight of the solvent, disintegrating the remaining composition into a fibrous mass and then removing the residual solvent from said fibrous mass by further evaporation under reduced pressure.

2. Process for the production of moulding stock suitable for the preparation of mouldings of high resistance to alkaline solutions and of high impact strength, which comprises healing phenol and acetaldehyde in approximately equimolecular proportions in the presence of an acid catalyst to obtain a thermo-setting condensation product, dissolving said condensation product in ethanol, mixing into said condensation product solution fibrous asbestos, a mould lubricant and hexamethylenetetramine in an amount capable of providing not substantially less than one molecular proportion of formaldehyde per molecular proportion of phenol that has gone into the production of said condensation product, removing the bulk of said ethanol by evaporation under reduced pressure until the composition contains about 5% of its weight of ethanol, disintegrating the remaining composition into a fibrous mass and then removing the residual ethanol solvent from said fibrous mass by further evaporation under reduced pressure.

JOHN ALLAN.

REFERENCES CITED

The following references are of record in the file of this patent:

UNITED STATES PATENTS

| Number | Name | Date |
|---|---|---|
| 941,605 | Backeland | Nov. 30, 1909 |
| 1,974,605 | Ellis | Sept. 25, 1934 |
| 2,373,058 | Silberkraus | Apr. 3, 1945 |

Certificate of Correction

Patent No. 2,452,420. October 26, 1948.

JOHN ALLAN

It is hereby certified that errors appear in the printed specification of the above numbered patent requiring correction as follows:

Column 3, line 33, Example 1, for "50% C." read *50° C.*; column 4, line 58, claim 1, and column 5, line 4, claim 2, for the word "healing" read *heating*;

and that the said Letters Patent should be read with these corrections therein that the same may conform to the record of the same in the Patent Office.

Signed and sealed this 17th day of May, A. D. 1949.

[SEAL]

THOMAS F. MURPHY,
*Assistant Commissioner of Patents.*